(12) United States Patent
Aso

(10) Patent No.: US 7,193,867 B2
(45) Date of Patent: Mar. 20, 2007

(54) DC CONVERTER

(75) Inventor: Shinji Aso, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/549,412

(22) PCT Filed: Nov. 9, 2004

(86) PCT No.: PCT/JP2004/016571

§ 371 (c)(1),
(2), (4) Date: Sep. 13, 2005

(87) PCT Pub. No.: WO2005/048439

PCT Pub. Date: May 26, 2005

(65) Prior Publication Data

US 2006/0171177 A1 Aug. 3, 2006

(30) Foreign Application Priority Data

Nov. 17, 2003 (JP) .............................. 2003-386862

(51) Int. Cl.
*H02M 3/335* (2006.01)
(52) U.S. Cl. ..................... 363/24; 363/25; 363/133; 363/134
(58) Field of Classification Search ................ 363/24, 363/25, 17, 133, 134
See application file for complete search history.

(56) References Cited

U.S. PATENT DOCUMENTS

| 5,459,650 | A | * | 10/1995 | Noro ............................. 363/24 |
| 5,805,432 | A | * | 9/1998 | Zaitsu et al. ................... 363/16 |
| 6,043,993 | A | * | 3/2000 | Kobori et al. ................. 363/17 |
| 6,166,927 | A | * | 12/2000 | Farrington et al. ........... 363/25 |
| 6,449,172 | B2 | * | 9/2002 | Nagahara ..................... 363/25 |
| 6,963,497 | B1 | * | 11/2005 | Herbert ........................ 363/25 |

FOREIGN PATENT DOCUMENTS

| JP | 07-203688 | 8/1995 |
| JP | 09-182429 | 11/1997 |
| JP | 2000-092829 | 3/2000 |
| JP | 2002-199719 | 7/2002 |
| JP | 2002-345240 | 11/2002 |

* cited by examiner

*Primary Examiner*—Bao Q. Vu
(74) *Attorney, Agent, or Firm*—Kilpatrick Stockton LLP

(57) ABSTRACT

A DC converter alternately turns on and off a main switch Q1 connected in series with a primary winding P1 of a transformer T and a sub-switch Q2 contained in a series circuit connected to each end of the primary winding P1 of the transformer T or to each end of the main switch Q1, rectifies and smoothes a voltage of a secondary winding S1 of the transformer T, and provides a DC output. The DC converter includes a time difference detection circuit 13 to detect an interval between when the main switch Q1 reaches a minimum voltage after the sub-switch Q2 is turned off and when the main switch Q1 is turned on and a first delay circuit 14 to delay the ON timing of the main switch Q1 according to an output from the time difference detection circuit 13 so that the main switch Q1 is turned on at around the minimum voltage.

16 Claims, 15 Drawing Sheets

DC CONVERTER

TECHNICAL FIELD

The present invention relates to a high-efficiency, low-noise DC converter.

BACKGROUND ART

FIG. 1 shows an example of a DC converter according to a related art. The DC converter shown in FIG. 1 is of an active clamp type disclosed in Japanese Unexamined Patent Application Publication No. 2000-92829. A DC power source Vin is connected through a primary winding P1 (the number of windings of n1) of a transformer T to a main switch Q1 consisting of a MOSFET (hereinafter referred to as FET). Each end of the primary winding P1 is connected to a series circuit consisting of a sub-switch Q2 such as a FET and a snubber capacitor C2. The main switch Q1 and sub-switch Q2 are alternately turned on and off under PWM control by a control circuit 111.

The primary winding P1 of the transformer T and a secondary winding S1 thereof are wound to generate in-phase voltages. The secondary winding S1 (the number of windings of n2) of the transformer T is connected to a rectifying/smoothing circuit consisting of diodes D10 and D11, a reactor L10, and a capacitor C10. The rectifying/smoothing circuit rectifies and smoothes a voltage induced on the secondary winding S1 of the transformer T, i.e., an ON/OFF-controlled pulse voltage and provides a DC output to a load 30.

The control circuit 111 generates, according to the output voltage to the load 30, a control signal composed of pulses to carry out ON/OFF control on the main switch Q1 and controls a duty factor of the control signal to bring the output voltage to a predetermined voltage.

The DC converter further includes an inverter 112, a bottom detection circuit 113, a first delay circuit 114, a second delay circuit 115, a low-side driver 116, and a high-side driver 117.

The inverter 112 inverts a Q1-control signal Q1c for the main switch Q1 provided by the control circuit 111 and outputs the inverted signal to the second delay circuit 115. The bottom detection circuit 113 detects a minimum voltage (bottom voltage) of the main switch Q1 after the sub-switch Q2 is turned off and outputs a bottom detection signal Btm.

The first delay circuit 114 delays the rise timing of the Q1-control signal Q1c from the control circuit 111 up to the fall timing of the bottom detection signal Btm from the bottom detection circuit 113 and provides a Q1-gate signal Q1g to the low-side driver 116. The low-side driver 116 applies the Q1-gate signal Q1g from the first delay circuit 114 to a gate of the main switch Q1, thereby driving the main switch Q1. The second delay circuit 115 delays, by a predetermined time, the rise timing of the Q2-control signal Q2c for the sub-switch Q2 provided by the inverter 112 and provides a Q2-gate signal Q2g to the high-side driver 117. The high-side driver 117 applies the Q2-gate signal Q2g from the second delay circuit 115 to a gate of the sub-switch Q2, thereby driving the sub-switch Q2.

Operation of the DC converter with the above-mentioned structure will be explained with reference to the timing chart of FIG. 2. In FIG. 2, a terminal voltage of the main switch Q1 is depicted by Q1v.

At time t31, the Q1-control signal Q1c from the control circuit 111 changes to high level, and the Q2-control signal Q2c changes to low level. As a result, the Q2-gate signal Q2g changes to low level to turn off the sub-switch Q2. The bottom detection signal Btm changes to high level at time t31.

When the sub-switch Q2 turns off, the voltage Q1v of the main switch Q1 decreases. At time t32, the bottom detection circuit 113 detects a minimum (bottom) value of the voltage Q1v. At this time, the bottom detection signal Btm from the bottom detection circuit 113 changes to low level.

At the fall timing (time t32) of the bottom detection signal Btm from the bottom detection circuit 113, the Q1-gate signal Q1g generated by the first delay circuit 114 changes to high level. The Q1-gate signal Q1g is applied through the low-side driver 116 to the gate of the main switch Q1, to turn on the main switch Q1. This realizes the bottom voltage switching or zero-volt switching of the main switch Q1.

When the main switch Q1 is turned on, a current from the DC power source Vin is conducted through the primary winding P1 of the transformer T to the main switch Q1. At this time, a current is conducted in the rectifying/smoothing circuit through a route of S1, D10, L10, C10, and S1.

At time t33, the Q1-control signal Q1c turns off the main switch Q1. Then, energy accumulated in the primary winding P1 of the transformer T and in a leakage inductance between the primary and secondary windings of the transformer T charges a parasitic capacitor (not shown) of the main switch Q1, to form a voltage resonance. As a result, the voltage Q1v of the main switch Q1 increases from time t33 to time t34. In the rectifying/smoothing circuit, a current is conducted through a route of L10, C10, D11, and L10 and is supplied to the load 30.

At time t34, the Q2-gate signal Q2g turns on the sub-switch Q2. Then, energy accumulated in the primary winding P1 of the transformer is supplied to the capacitor C2, to charge the capacitor C2. Thereafter, energy accumulated in the capacitor C2 flows through a route of C2, Q2, P1, and C2. The related art is disclosed in Japanese Unexamined Patent Application Publication No. H7-203688, for example.

DISCLOSURE OF INVENTION

According to the DC converter of the related art mentioned above, the bottom detection circuit 113 detects a minimum voltage of the main switch Q1 after the sub-switch Q2 is turned off, and an ON delay of the main switch Q1 is controlled such that the Q1-gate signal Q1g changes to high level at the fall timing of the bottom detection signal Btm. If the bottom detection circuit 113 involves a detection error or if there is disturbance, a detection point will be disturbed. This will vary the delay time of the main switch Q1, thus fluctuating the Q1-gate signal Q1g of the main switch Q1 and greatly destabilizing the operation of the DC converter.

If there is a delay between bottom detection and activation of the main switch Q1, the ON timing of the main switch Q1 will delay behind the bottom. To avoid this, the components must be configured to minimize the delay between bottom detection and activation of the main switch Q1. For this, the main switch Q1 must be turned on at high speed. This, however, increases switching noise.

The present invention provides a DC converter capable of stabilizing operation against a detection point error caused by an error of a bottom detection circuit or by disturbance, eliminating the influence of a delay between bottom detection and activation of a main switch, and minimizing switching noise.

A first technical aspect of the present invention provides a DC converter that alternately turns on and off a main switch connected in series with a primary winding of a transformer and a sub-switch contained in a series circuit connected to each end of the primary winding of the transformer or to each end of the main switch, rectifies and smoothes a voltage of a secondary winding of the transformer with a rectifying/smoothing circuit, and provides a DC output. The DC converter is characterized in that it employs a time difference detector to detect an interval between when the main switch reaches a minimum voltage after the sub-switch is turned off and when the main switch is turned on, and a delay controller to delay the ON timing of the main switch according to an output from the time difference detector so that the main switch is turned on around the minimum voltage.

A second technical aspect of the present invention provides a DC converter that alternately turns on and off a main switch connected in series with a primary winding of a transformer and a sub-switch contained in a series circuit connected to each end of the primary winding of the transformer or to each end of the main switch, rectifies and smoothes a voltage of a secondary winding of the transformer with a rectifying/smoothing circuit, and provides a DC output. The DC converter is characterized in that it has a bottom detector to detect a minimum voltage of the main switch when the main switch decreases voltage after the sub-switch is turned off, an ON detector to detect an instance when the main switch is turned on, a time difference detector to detect an interval between when the bottom detector detects the minimum voltage and when the ON detector detects an ON state of the main switch, and a delay controller to delay the ON timing of the main switch according to an output from the time difference detector so that the main switch is turned on at around the minimum voltage.

BEST MODE FOR CARRYING OUT THE INVENTION

DC converters according to the embodiments of the present invention will be explained in detail with reference to the drawings.

First Embodiment

Figure 1:
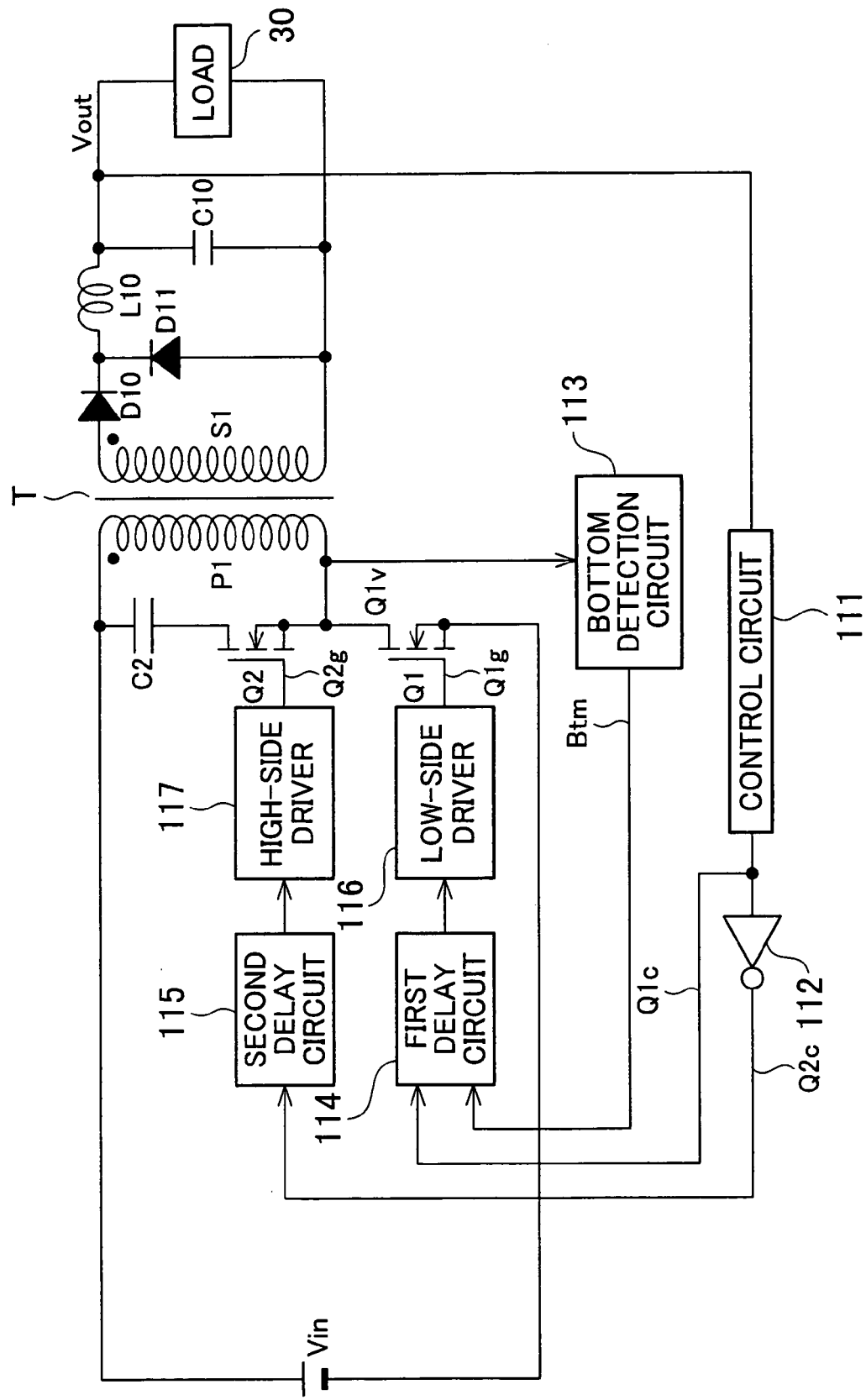
FIG. 1 is a circuit diagram showing an example of a DC converter according to a related art.
Figure 2:
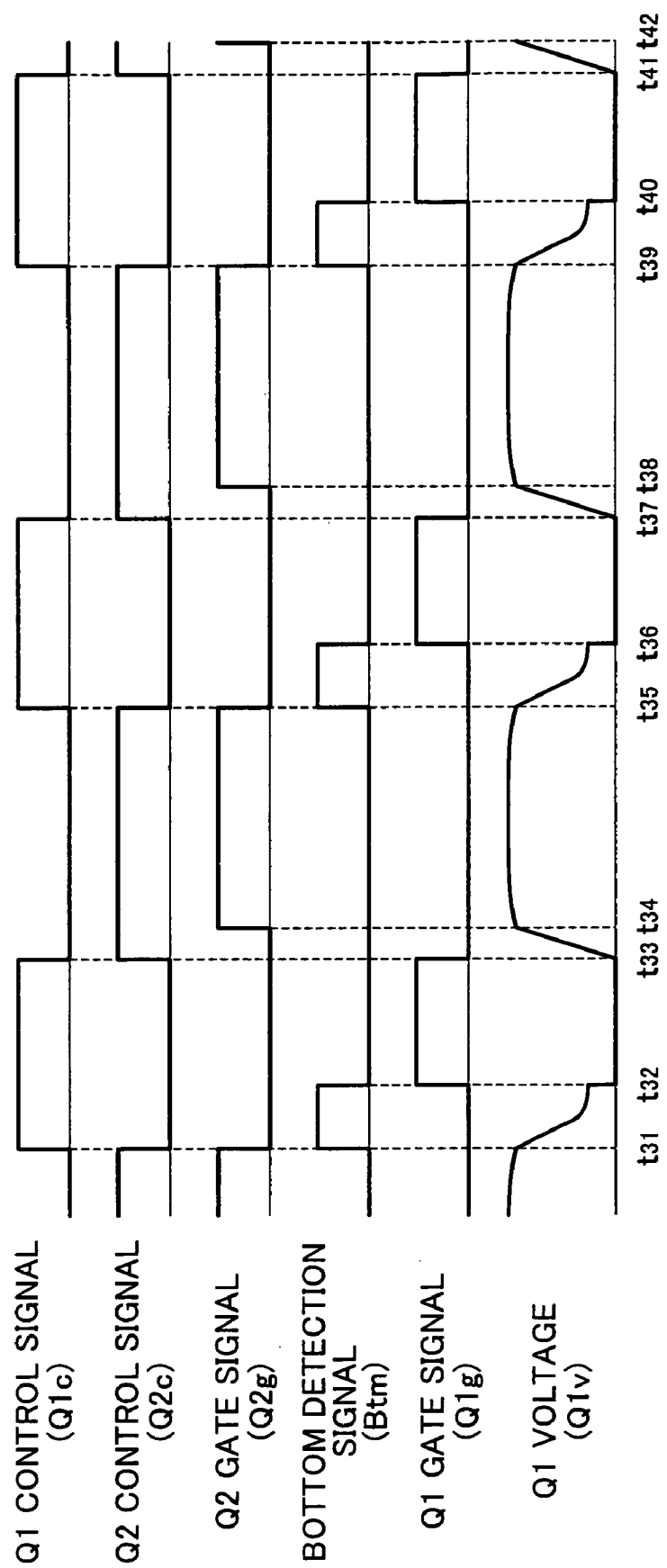
FIG. 2 is a timing chart showing signals at various parts of the DC converter of the related art.
Figure 3:
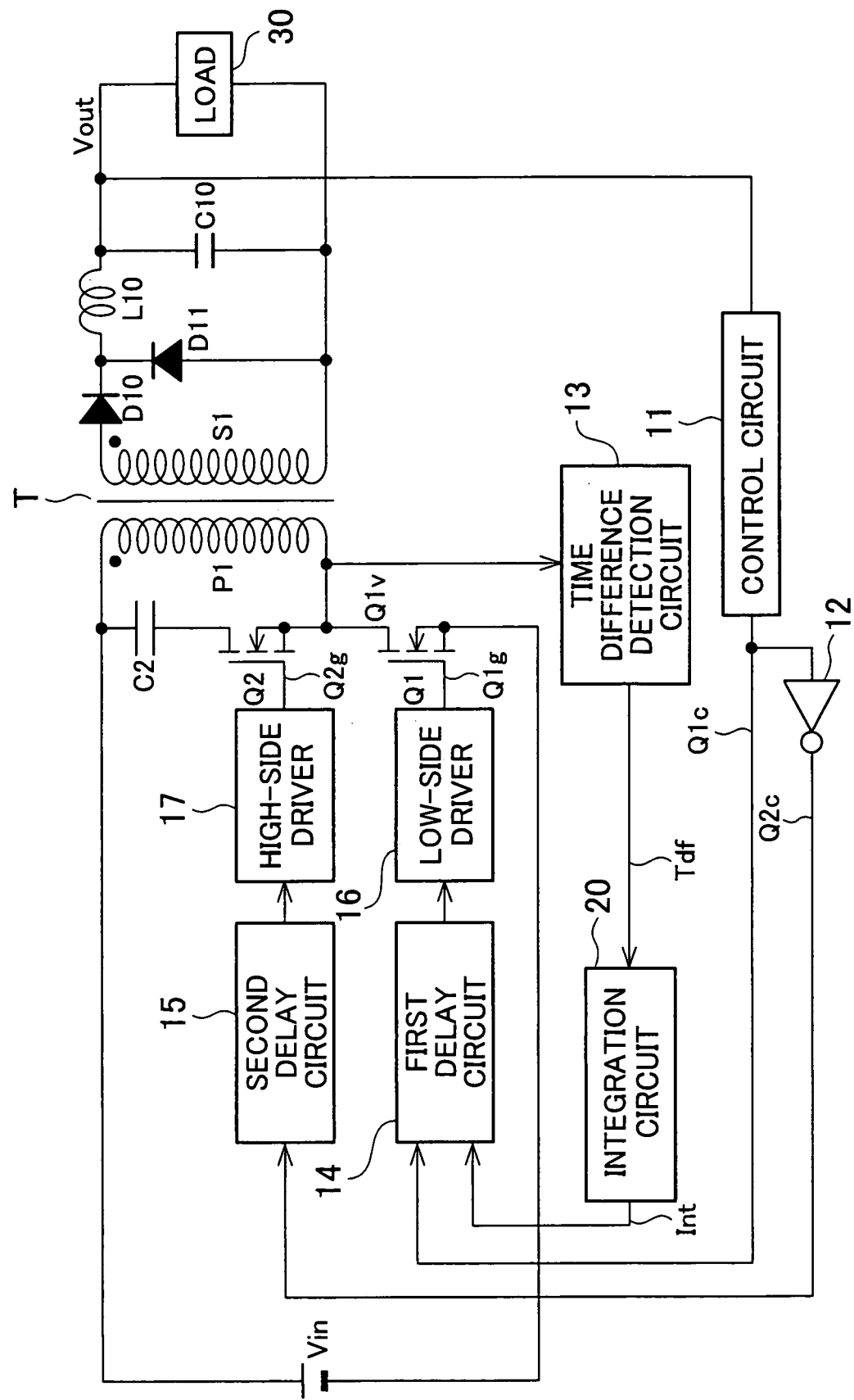
FIG. 3 is a circuit diagram showing a DC converter according to a first embodiment of the present invention.

FIG. 3 is a circuit diagram showing a DC converter according to the first embodiment. In FIG. 3, the same parts as those of FIG. 1 are represented with like reference marks to omit or simplify their explanations.

In the DC converter of FIG. 3, a main switch Q1 and a sub-switch Q2 have a common OFF period (dead time) and are alternately turned on and off under PWM control carried out by a control circuit 11. The control circuit 11 generates, according to an output voltage of a load 30, a control pulse signal to carry out ON/OFF control on the main switch Q1 and control a duty factor of the control signal so that a rectifying/smoothing circuit may provide a predetermined output voltage.

The DC converter further includes an inverter 12, a time difference detection circuit 13, a first delay circuit 14, a second delay circuit 15, a low-side driver 16, a high-side driver 17, and an integration circuit 20.

Figure 4:
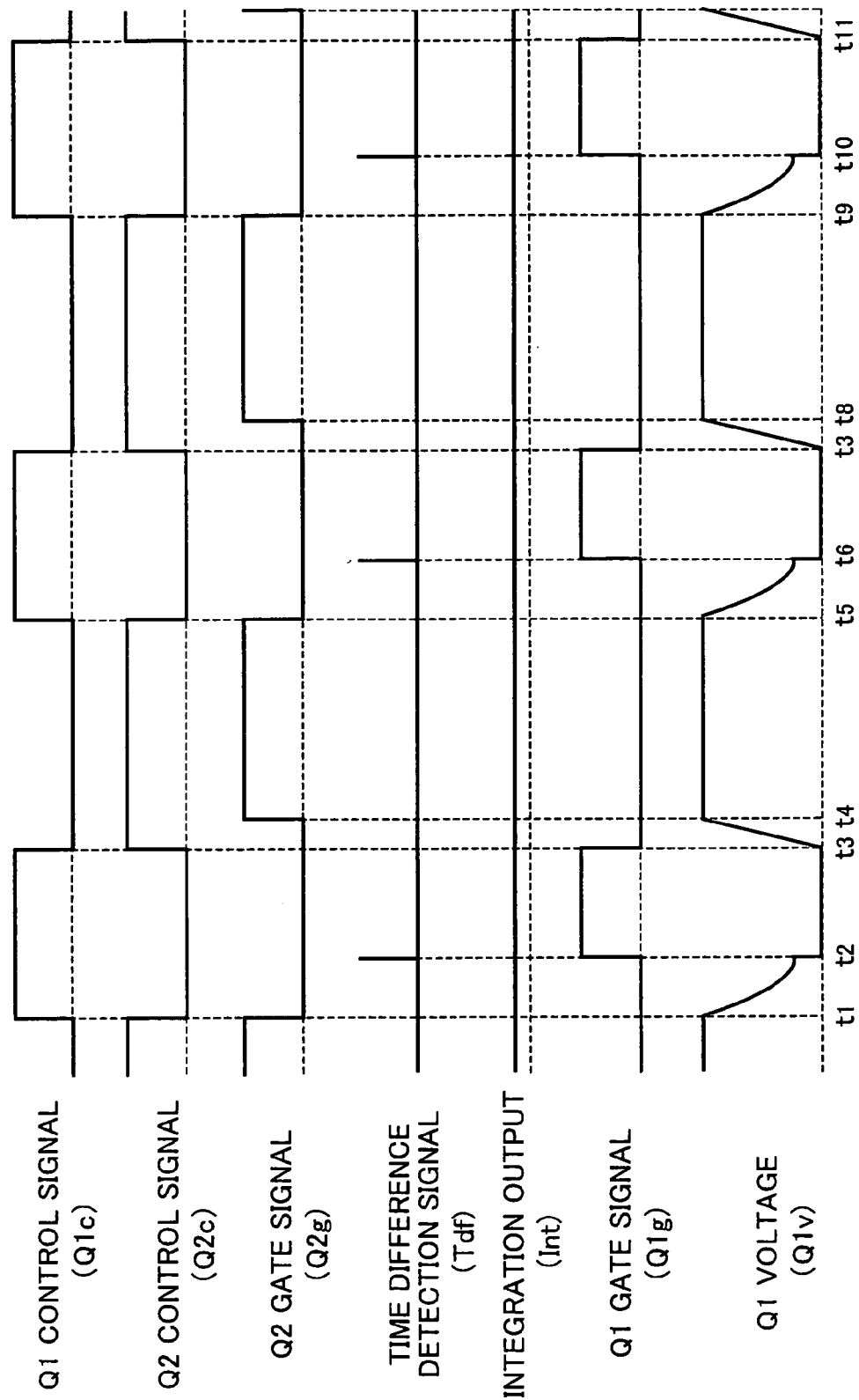
FIG. 4 is a timing chart showing signals at various parts of the DC converter of the first embodiment with a time difference detection signal being a zero.

The inverter 12 inverts a Q1-control signal Q1c for the main switch Q1 provided by the control circuit 11 and outputs the inverted signal to the second delay circuit 15. The time difference detection circuit 13 detects, as shown in FIG. 4, an interval between when the main switch Q1 reaches a minimum voltage (bottom voltage) after the sub-switch Q2 is turned off and when the main switch Q1 is turned on and outputs a time difference detection signal Tdf. The integration circuit 20 integrates the time difference detection signal Tdf from the time difference detection circuit 13 and outputs an integration output Int.

The first delay circuit 14 is a delay controller of the present invention. The first delay circuit 14 receives the integration output Int from the integration circuit 20 and the Q1-control signal Q1c from the control circuit 11 and outputs a Q1-gate signal Q1g to the low-side driver 16. More precisely, the first delay circuit 14 generates the Q1-gate signal Q1g so that a delay time between a rise of the Q1-control signal Q1c and a rise of the Q1-gate signal Q1g becomes shorter as the value of the integration output Int from the integration circuit 20 becomes larger.

The low-side driver 16 applies the Q1-gate signal Q1g from the first delay circuit 14 to a gate of the main switch Q1, thereby driving the main switch Q1. The second delay circuit 15 generates a Q2-gate signal Q2g by delaying, by a predetermined time, a rise of the Q2-control signal Q2c for the sub-switch Q2 provided by the inverter 12 and supplies the Q2-gate signal Q2g to the high-side driver 17. The high-side driver 17 applies the Q2-gate signal Q2g from the second delay circuit 15 to a gate of the sub-switch Q2, thereby driving the sub-switch Q2.

Figure 5:
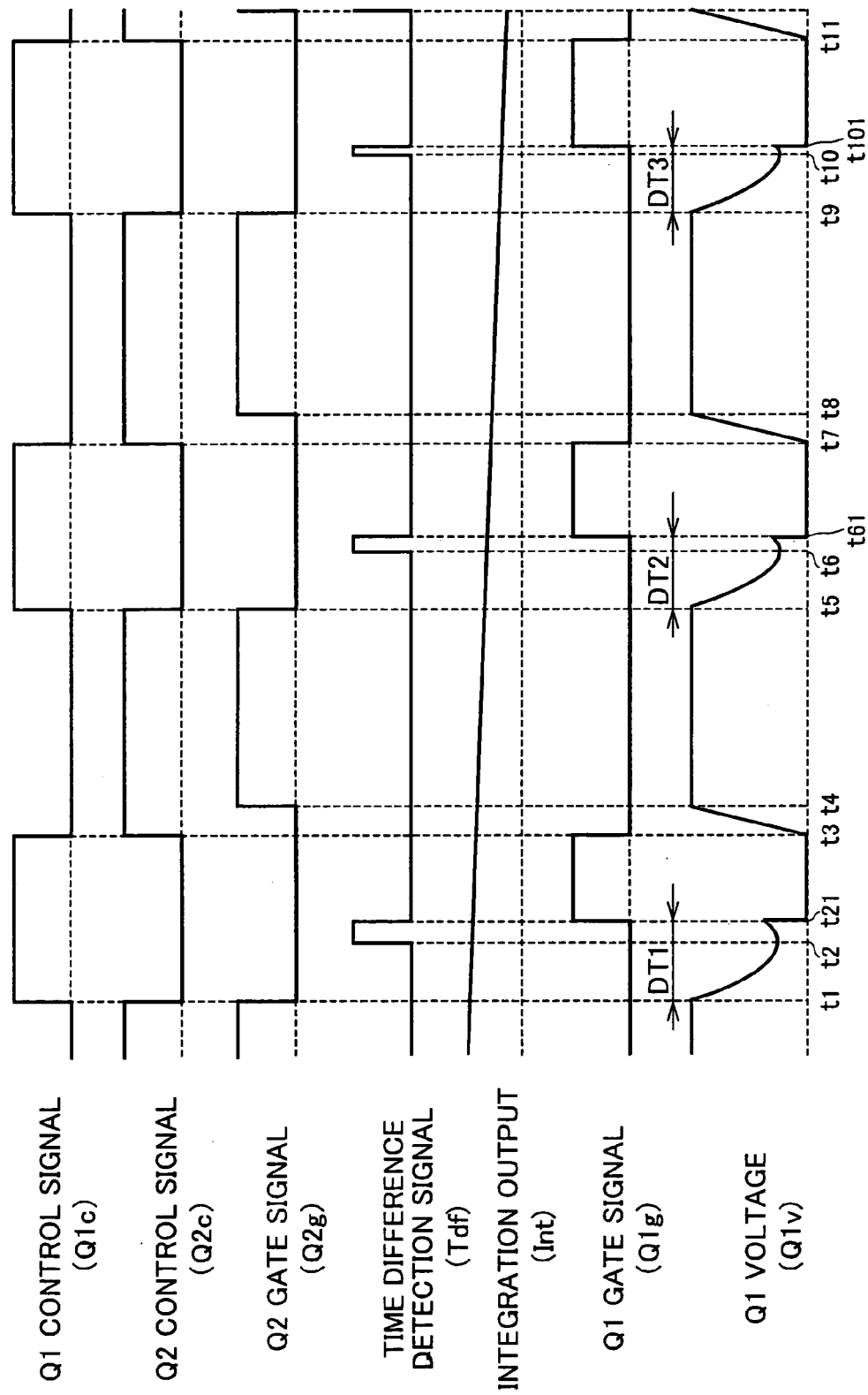
FIG. 5 is a timing chart showing signals at the various parts of the DC converter of the first embodiment with the time difference detection signal being in a transient period to approach a zero.

Operation of the DC converter with the above-mentioned structure will be explained with reference to the timing charts of FIGS. 4 and 5. The timing chart of FIG. 4 shows signals at various parts of the DC converter according to the first embodiment in a steady state with the time difference detection circuit 13 providing no output. The timing chart of FIG. 5 shows signals at the various parts of the DC converter according to the first embodiment in a transient state with the time difference detection circuit 13 providing a large output that gradually decreases.

At time t1, the Q1-control signal Q1c from the control circuit 11 changes to high level, and the Q2-control signal Q2c changes to low level. As a result, the Q2-gate signal Q2g changes to low level to turn off the sub-switch Q2. The time difference detection signal Tdf changes to low level at time t1.

When the sub-switch Q2 turns off, the voltage Q1v of the main switch Q1 starts to decrease. At time t2, the voltage Q1v of the main switch Q1 reaches a minimum voltage (bottom voltage), and as shown in FIG. 5, the time difference detection signal Tdf from the time difference detection circuit 13 changes to high level. The time difference detection signal Tdf has a pulse width corresponding to a time period between when the main switch Q1 reaches the minimum voltage (for example, at time t2) and when the main switch Q1 turns on (for example, at time t21).

The time difference detection signal Tdf from the time difference detection circuit 13 is integrated by the integration circuit 20, and therefore, the integration output Int has a value directly proportional to the size of the time difference detection signal Tdf. Based on the integration output Int from the integration circuit 20, the first delay circuit 14 shortens a delay time between a rise of the Q1-control signal Q1c and a rise of the Q1-gate signal Q1g. Between time t2 and time t21, for example, the integration output Int is relatively large, and therefore, a delay time DT1 between the rise timing t1 of the Q1-control signal Q1c and the rise timing t21 of the Q1-gate signal Q1g is controlled to be shorter. As a result, in the next period, the delay time becomes DT2 between rise timing t5 of the Q1-control signal Q1c and rise timing t61 of the Q1-gate signal Q1g. Then, in the next period, the delay time becomes DT3 between rise timing t9 of the Q1-control signal Q1c and rise timing t101 of the Q1-gate signal Q1g. In this way, due to the delay control of the actual rise timing (ON timing) of the Q1-gate signal Q1g, the interval between when the main switch Q1 approaches a zero and reaches a minimum voltage and when the main switch Q1 turns on. If the interval between when the main switch Q1 reaches a minimum voltage and when the main switch Q1 turns on becomes a zero, the timing chart of FIG. 4 is realized. Namely, the main switch Q1 achieves bottom voltage switching or zero-volt switching.

At time t21, the Q1-gate signal Q1g is applied through the low-side driver 16 to the gate of the main switch Q1, to turn on the main switch Q1.

When the main switch Q1 turns on, a current from the DC power source Vin is conducted through the primary winding P1 of the transformer T to the main switch Q1. At this time, a current is conducted in the rectifying/smoothing circuit through a route of S1, D10, L10, C10, and S1.

At time t3, the Q1-control signal Q1c turns off the main switch Q1. Then, energy accumulated in the primary winding P1 of the transformer T and in a leakage inductance between the primary and secondary windings of the transformer T charges a parasitic capacitor (not shown) of the main switch Q1 (between the drain and source of the FET). This forms a voltage resonance to increase the voltage Q1v of the main switch Q1 between time t3 and time t4. In the rectifying/smoothing circuit, a current is conducted through a route of L10, C10, D11, and L10 and is supplied to the load 30.

The second delay circuit 15 generates the Q2-gate signal Q2g by delaying, by a predetermined time, the rise timing of the Q2-control signal Q2c for the sub-switch Q2 provided by the inverter 12. At time t4, the Q2-gate signal Q2g is applied through the high-side driver 17 to the gate of the sub-switch Q2, to turn on the sub-switch Q2. As a result, energy accumulated in the primary winding P1 of the transformer T is supplied to the capacitor C2, to charge the capacitor C2. Then, energy accumulated in the capacitor C2 flows through a route of C2, Q2, P1, and C2.

Figure 6:
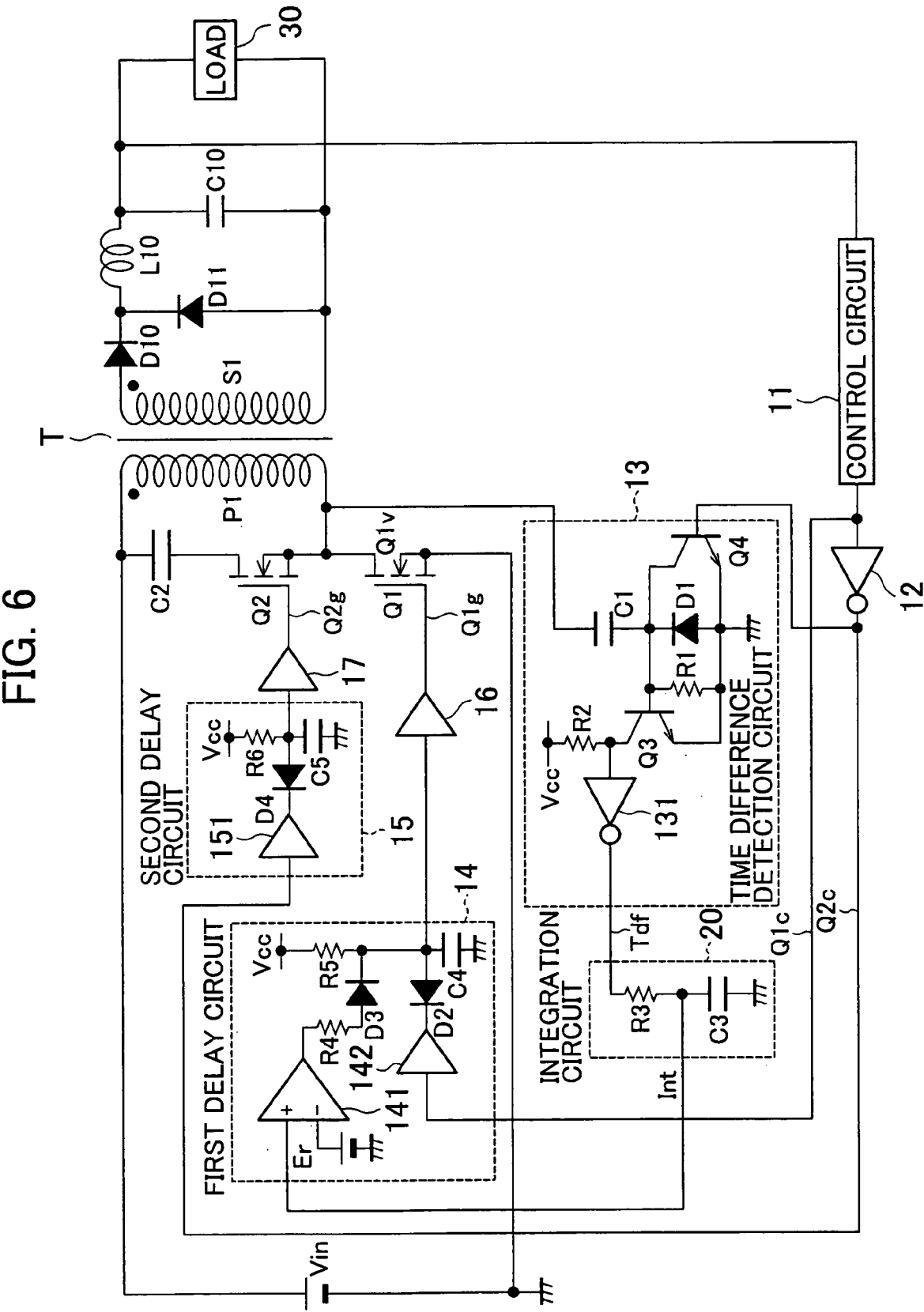
FIG. 6 is a circuit diagram showing the details of a time difference detection circuit, an integration circuit, a first delay circuit, and a second delay circuit in the DC converter of FIG. 3.

FIG. 6 is a circuit diagram showing the details of the time difference detection circuit 13, integration circuit 20, first delay circuit 14, and second delay circuit 15 in the DC converter of FIG. 3.

In the time difference detection circuit 13 of FIG. 6, a base of a transistor Q3 is connected to a cathode of a diode D1, a first end of a resistor R1, a first end of a capacitor C1, and a collector of a transistor Q4. An emitter of the transistor Q3 is connected to an anode of the diode D1, a second end of the resistor R1, and an emitter of the transistor Q4 and is grounded. A collector of the transistor Q3 is connected to a first end of a resistor R2 and an input terminal of an inverter 131. A second end of the resistor R2 is connected to a power source Vcc. An output terminal of the inverter 131 is connected to the integration circuit 20. A second end of the capacitor C1 is connected to the drain of the main switch Q1. A base of the transistor Q4 is connected to the output terminal of the inverter 12.

The integration circuit 20 comprises a resistor R3 and a capacitor C3 that are connected in series. A first end of the resistor R3 is connected to the output terminal of the inverter 131. A first end of the capacitor C3 is grounded. A connection point between the capacitor C3 and the resistor R3 provides the integration output Int to a non-inversion terminal (+) of an error amplifier 141 of the first delay circuit 14.

In the first delay circuit 14, an inversion terminal (−) of the error amplifier 141 is connected to a reference power source Er, and an output terminal of the error amplifier 141 is connected through a resistor R4 to an anode of a diode D3. A cathode of the diode D3 is connected to a first end of a resistor R5 and a first end of a capacitor C4. A second end of the resistor R5 is connected to the power source Vcc. A second end of the capacitor C4 is grounded. The output of the control circuit 11 is connected through a buffer 142 to a cathode of a diode D2. An anode of the diode D2 is connected to the first end of the capacitor C4. A connection point between the resistor R5 and the capacitor C4 is connected through the low-side driver 16 to the gate of the main switch Q1.

In the second delay circuit 15, the output of the inverter 12 is connected through a buffer 151 to a cathode of a diode D4. An anode of the diode D4 is connected to a first end of a capacitor C5 and a first end of a resistor R6. A second end of the resistor R6 is connected to the power source Vcc. A second end of the capacitor C5 is grounded. A connection point between the resistor R6 and the capacitor C5 is connected through the high-side driver 17 to the gate of the sub-switch Q2.

Operation of the DC converter, in particular, the time difference detection circuit 13, integration circuit 20, first delay circuit 14, and second delay circuit 15 will be explained with reference to the timing charts of FIGS. 4 and 5.

At time t1, the Q1-control signal Q1c from the control circuit 11 changes to high level, and the Q2-control signal Q2c changes to low level. As a result, the Q2-gate signal Q2g changes to low level to turn off the sub-switch Q2.

When the sub-switch Q2 turns off, the voltage Q1v of the main switch Q1 decreases from time t1 to time t2. In the time difference detection circuit 13 at this time, the Q2-control signal Q2 is at low level, and therefore, the transistor Q4 is turned off and a current is conducted through a route of D1, C1, P1, Vin, and GND to turn off the transistor Q3. Then, the collector of the transistor Q3 changes to high level, and the output terminal of the inverter 131 outputs a time difference detection signal Tdf of low level, which is supplied to the first end of the resistor R3 in the integration circuit 20.

Discharging of the capacitor C1 ends, and the voltage Q1v reaches a minimum (bottom) value at time t2. A current is conducted through a route of Vin, P1, C1, and Q3 to turn on the transistor Q3. The collector of the transistor Q3 changes to low level, and the output terminal of the inverter 131 outputs a time difference detection signal Tdf of high level, which is supplied to the first end of the resistor R3 in the integration circuit 20.

The time difference detection signal Tdf of high level is supplied to the first end of the resistor R3 of the integration circuit 20 from time t2 to time t21. As a result, the integration output Int from the connection point between the resistor R3 and the capacitor C3 has a high voltage, which is supplied to the non-inversion terminal (+) of the error amplifier 141. The output of the error amplifier 141 provides a voltage corresponding to the integration output value. This voltage causes a current to be conducted through a route of R4, D3, and C4. The capacitor C4 receives the sum of a current from the resistor R5 and the current from the diode D3. This shortens the charging period of the capacitor C4.

According to the value of the integration output Int from the integration circuit 20, the charging period of the capacitor C4 shortens to shorten a delay time between a rise of the Q1-control signal Q1c and a rise of the Q1-gate signal Q1g. As explained with the timing chart of FIG. 5, the interval between when the main switch Q1 approaches a zero by the delay control of the actual rise timing (ON timing) of the Q1-gate signal Q1g and the interval reaches a minimum voltage and when the main switch Q1 turns on. If the interval between when the main switch Q1 reaches a minimum voltage and when the main switch Q1 turns on becomes a zero, the timing chart of FIG. 4 is attained. Namely, the main switch Q1 realizes bottom voltage switching or zero-volt switching.

At time t21, the Q1-gate signal Q1g is applied through the low-side driver 16 to the gate of the main switch Q1, to turn on the main switch Q1.

When the main switch Q1 turns on, a current is conducted from the DC power source Vin through the primary winding P1 of the transformer T to the main switch Q1. At this time, a current is conducted in the rectifying/smoothing circuit through a route of S1, D10, L10, C10, and S1.

At time t3, the Q1-control signal Q1c turns off the main switch Q1. Then, energy accumulated in the primary winding P1 of the transformer T and in the leakage inductance between the primary and secondary windings of the transformer T charges the parasitic capacitor (not shown) of the main switch Q1 (between the drain and source of the FET), to form a voltage resonance. This increases the voltage Q1v of the main switch Q1 from time t3 to time t4.

If the transistor Q4 is kept OFF, the increase in the voltage Q1v of the main switch Q1 turns on the transistor Q3, so that the output terminal of the inverter 131 outputs a time difference detection signal Tdf of high level, which is supplied to the first end of the resistor R3 in the integration circuit 20. This may disturb the delay control carried out by the first delay circuit 14. Accordingly, the transistor Q4 of the time difference detection circuit 13 is turned on if the Q2-control signal Q2c is at high level (between time t3 and time t5), to turn off the transistor Q3 and keep the time difference detection signal Tdf at low level. In the rectifying/smoothing circuit, a current is conducted through a path including of L10, C10, D11, and L10 and is supplied to the load 30.

The Q2-control signal Q2c of high level is supplied through the buffer 151 to the cathode of the diode D4, to put the diode D4 in a reversely biased state. As a result, a current is conducted from the power source Vcc to the capacitor C5 through the resistor R6, to charge the capacitor C5, so that the second delay circuit 15 generates the Q2-gate signal Q2g whose rise is delayed by a delay time determined by time constants of R6 and C5.

At time t4, the Q2-gate signal Q2g is applied through the high-side driver 17 to the gate of the sub-switch Q2, to turn on the sub-switch Q2. Then, energy accumulated in the primary winding P1 of the transformer T is supplied to the capacitor C2, to charge the capacitor C2. Thereafter, energy accumulated in the capacitor C2 is passed through a path including C2, Q2, P1, and C2.

In this way, the DC converter of this embodiment detects an interval between when the main switch Q1 reaches a minimum voltage after the sub-switch Q2 is turned off and when the main switch Q1 is turned on, integrates the detected interval, and according to the integration result, conducts feedback control to decrease the interval between when the main switch Q1 reaches a minimum voltage and when the main switch Q1 is turned on. This stabilizes operation against a detection point fluctuation caused by an error or disturbance that occurs with the conventional bottom detection circuit.

The time difference detection signal Tdf provided by the time difference detection circuit 13 disappears when the main switch Q1 is turned on at a minimum voltage. Accordingly, the time difference detection signal Tdf can be used with the integration circuit 20 to control the control signal for the main switch Q1 and turn on the main switch Q1 at around a minimum voltage. The integration circuit 20 is useful to stabilize operation.

Detecting a time difference between when the main switch Q1 reaches a minimum voltage and when the main switch Q1 is turned on eliminates the influence of a delay between an application of the control signal to the main switch Q1 and an activation of the main switch Q1. This eliminates the need of turning on the main switch Q1 at high speed, thereby minimizing switching noise.

Modification of the First Embodiment

Figure 7:
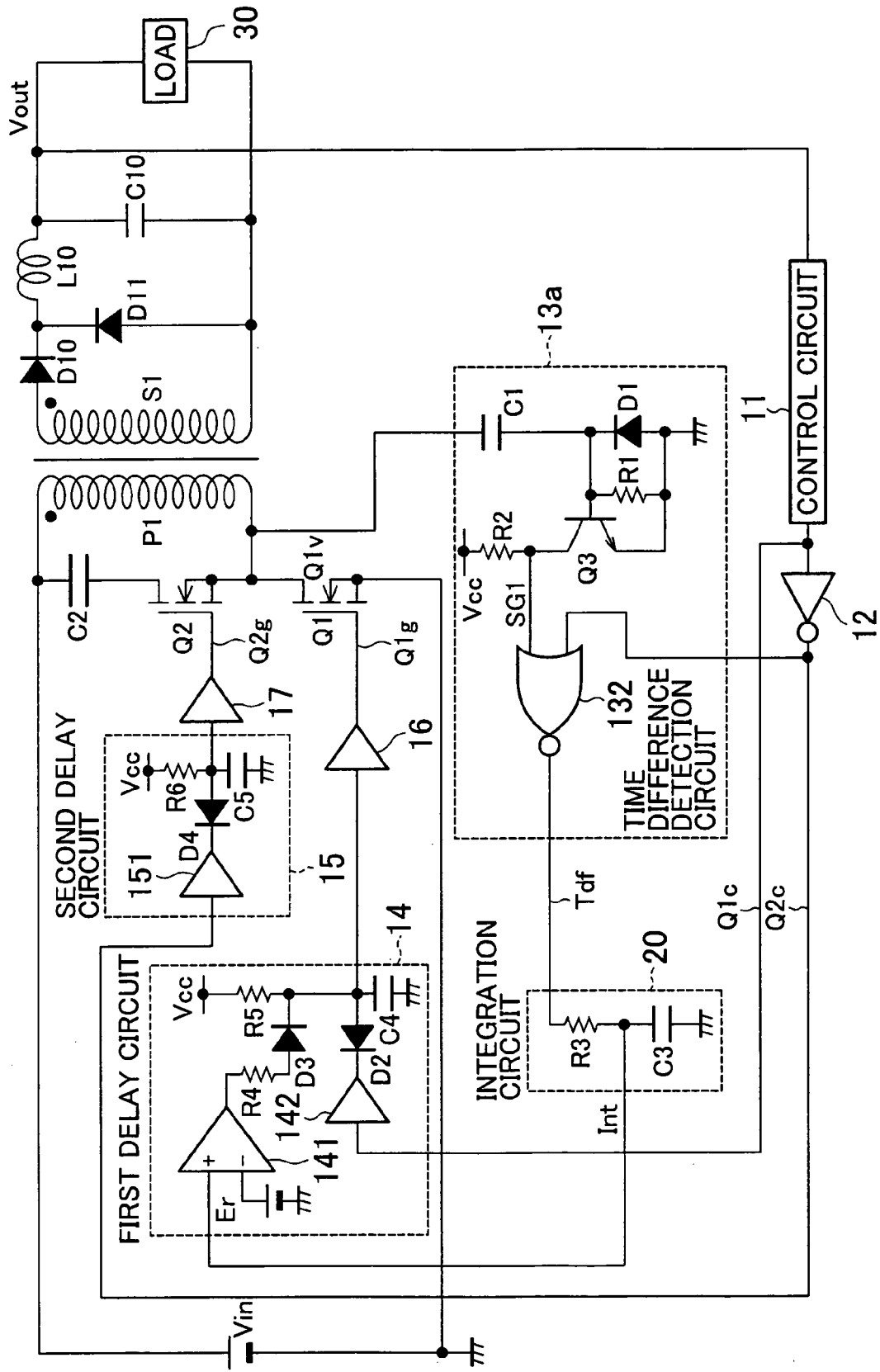
FIG. 7 is a circuit diagram showing a DC converter according to a modification of the first embodiment.

FIG. 7 is a circuit diagram showing a DC converter according to a modification of the first embodiment. The DC converter according to the modification of the first embodiment shown in FIG. 7 differs from the DC converter of the first embodiment in a time difference detection circuit. In the following explanation, the same parts as those of FIG. 6 are represented with like reference marks to omit their explanations.

In the time difference detection circuit 13a of FIG. 7, a base of a transistor Q3 is connected to a cathode of a diode D1, a first end of a resistor R1, and a first end of a capacitor C1. An emitter of the transistor Q3 is connected to an anode of the diode D1 and a second end of the resistor R1 and is grounded. A collector of the transistor Q3 is connected to a first end of a resistor R2 and a first input terminal of a NOR gate 132. A second end of the resistor R2 is connected to a power source Vcc. A second input terminal of the NOR gate 132 is connected to the output terminal of the inverter 12. An output terminal of the NOR gate 132 is connected to the integration circuit 20. A second end of the capacitor C1 is connected to the drain of the main switch Q1.

Figure 8:
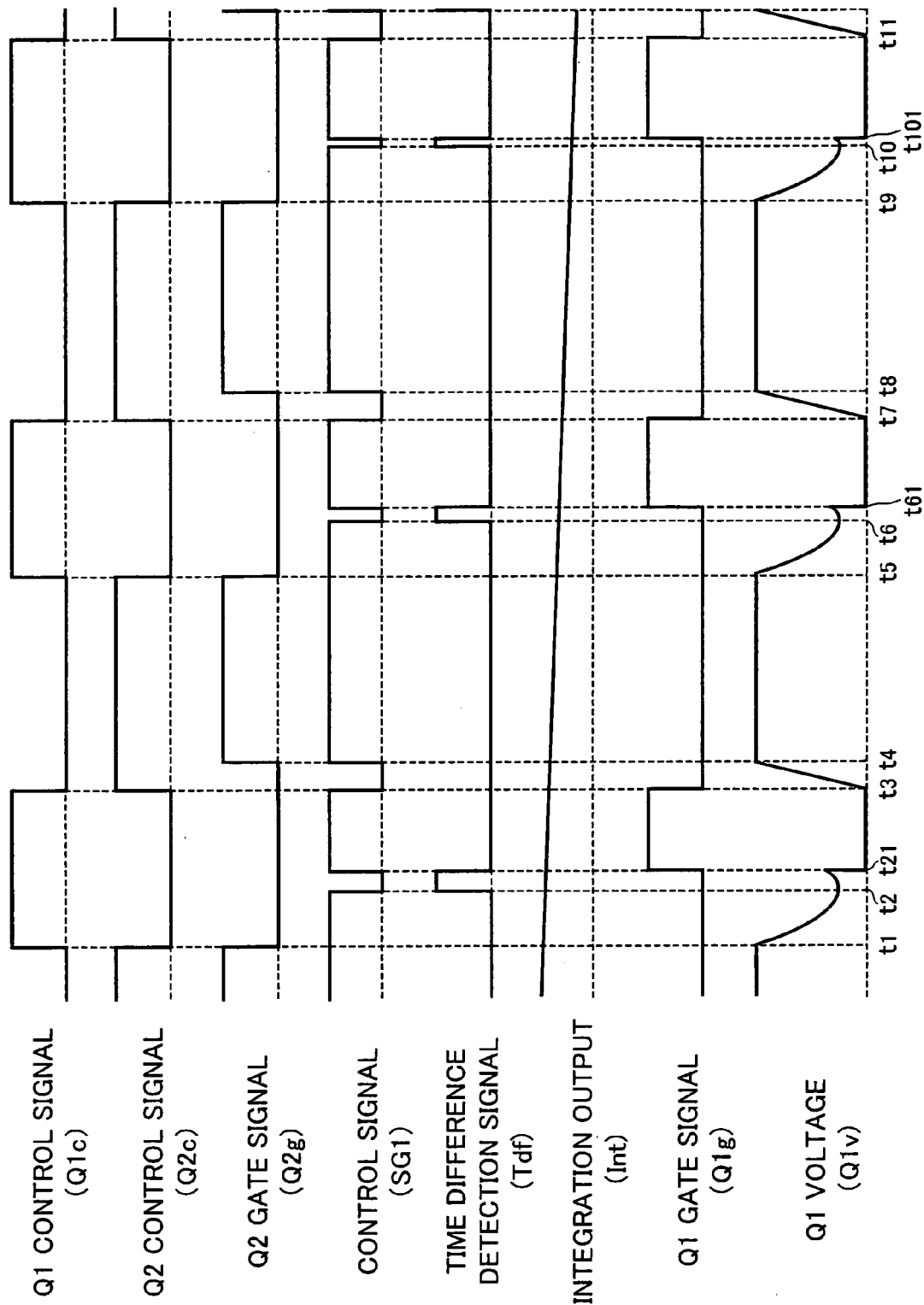
FIG. 8 is a timing chart showing operation of the DC converter according to the modification of the first embodiment.

Operation of the DC converter according to the modification of the first embodiment with such a structure will be explained with reference to the timing chart of FIG. 8. Operation of the time difference detection circuit 13a will mainly be explained.

Between time t1 and time t2, the voltage Q1v of the main switch Q1 decreases. In the time difference detection circuit 13a, a current is conducted through a path including D1, C1, P1, Vin, and GND to turn off the transistor Q3. As a result, the collector of the transistor Q3 changes to high level, and a control signal SG1 is supplied to the first input terminal of the NOR gate 132. Irrespective of a signal to the second input terminal, the NOR gate 132 supplies a time difference detection signal Tdf of low level from the output terminal thereof to the first end of the resistor R3 of the integration circuit 20.

At time t2, the voltage Q1v reaches a minimum (bottom) value, and a current is conducted through a path including Vin, P1, C1, and Q3 to turn on the transistor Q3. This changes the collector of the transistor Q3 to low level, and the control signal SG1 is supplied to the first input terminal of the NOR gate 132. At this time, the second input terminal of the NOR gate 132 receives a Q2-control signal Q2c of low level, and therefore, the output terminal thereof provides a time difference detection signal Tdf of high level to the first end of the resistor R3 of the integration circuit 20.

In a period between time t2 and time t21, the time difference detection signal Tdf of high level is supplied to the first end of the resistor R3 of the integration circuit 20. As a result, an integration output Int from the connection point between the resistor R3 and the capacitor C3 has a high voltage, which is supplied to the non-inversion terminal (+) of the error amplifier 141. Then, the output of the error amplifier 141 has a voltage corresponding to a value of the integration output.

Namely, a charging current corresponding to an increase in the value of the integration output Int from the integration circuit 20 is supplied to shorten a charging time of the capacitor C4 and further shorten a delay time between a rise of the Q1-control signal Q1c and a rise of the Q1-gate signal Q1g. As explained above, due to the delay control of the actual rise timing (ON timing) of the Q1-gate signal Q1g adaptively, the interval between when the main switch Q1 reaches a minimum voltage and when the main switch Q1 turns on becomes a zero.

In this way, the DC converter according to the modification of the first embodiment can provide an effect similar to that provided by the DC converter of the first embodiment.

Second Embodiment

Figure 9:
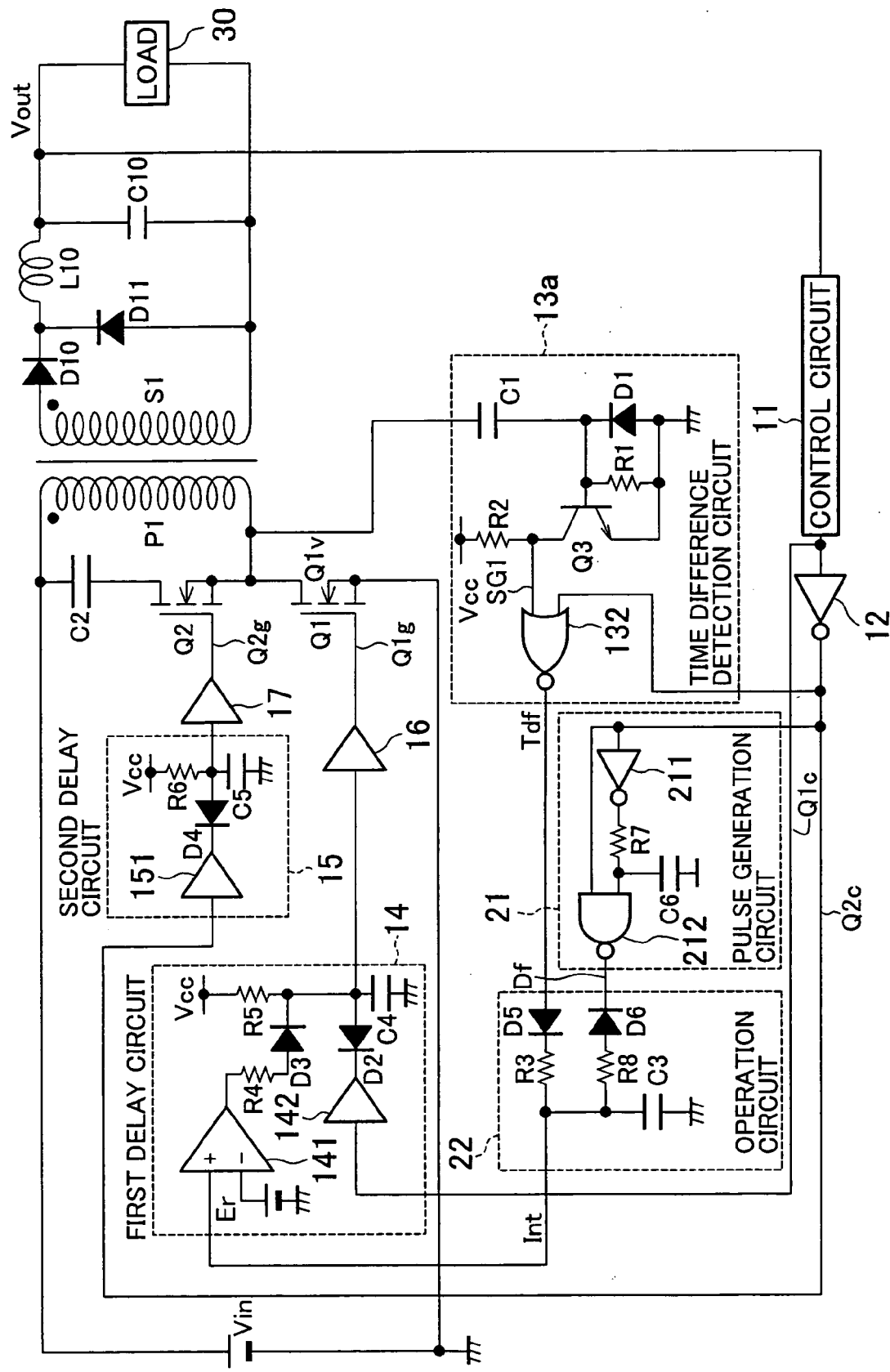
FIG. 9 is a circuit diagram showing a DC converter according to a second embodiment of the present invention.

FIG. 9 is a circuit diagram showing a DC converter according to the second embodiment. The DC converter according to the second embodiment shown in FIG. 9 differs from the DC converter according to the modification of the first embodiment in that it additionally has a pulse generation circuit 21 and an operation circuit 22 instead of the integration circuit 20. In the following explanation, the same parts as those of FIG. 7 are represented with like reference marks to omit or simplify their explanations.

The pulse generation circuit 21 of FIG. 9 forms a differential circuit to detect a rising edge of a Q2-control signal Q2c provided by an inverter 12. In the pulse generation circuit 21, a first input terminal of a NAND gate 212 is connected to the inverter 12 and a second input terminal thereof is connected to the inverter 12 through an integration circuit, which is composed of a resistor R7 and a capacitor C6, and an inverter 211. The pulse generation circuit 21 generates a differential signal Df of low level whose pulse width is determined by time constants of the resistor R7 and capacitor C6. The differential signal Df is supplied to the operation circuit 22. The pulse generation circuit 21 corresponds to a subtracter of the present invention that subtracts a predetermined value from a sum provided by the operation circuit 22 at intervals of an ON/OFF period of a switch Q1.

The operation circuit 22 corresponds to an adder of the present invention which adds up the output of a time difference detection circuit 13a and in which a cathode of a diode D5, a resistor R3, and a first end of a capacitor C3 are connected in series. An anode of the diode D5 is connected to an output terminal of a NOR gate 132 of the time difference detection circuit 13a. A second end of the capacitor C3 is grounded. A connection point between the resistor R3 and the capacitor C3 is connected to a first end of a resistor R8. A second end of the resistor R8 is connected to an anode of a diode D6. A cathode of the diode d6 is connected to the output terminal of the NAND gate 212 of the pulse generation circuit 21. The connection point between the resistor R3 and the capacitor C3 provides an operation output Int to a non-inversion terminal (+) of an error amplifier 141 of a first delay circuit 14.

Figure 10:
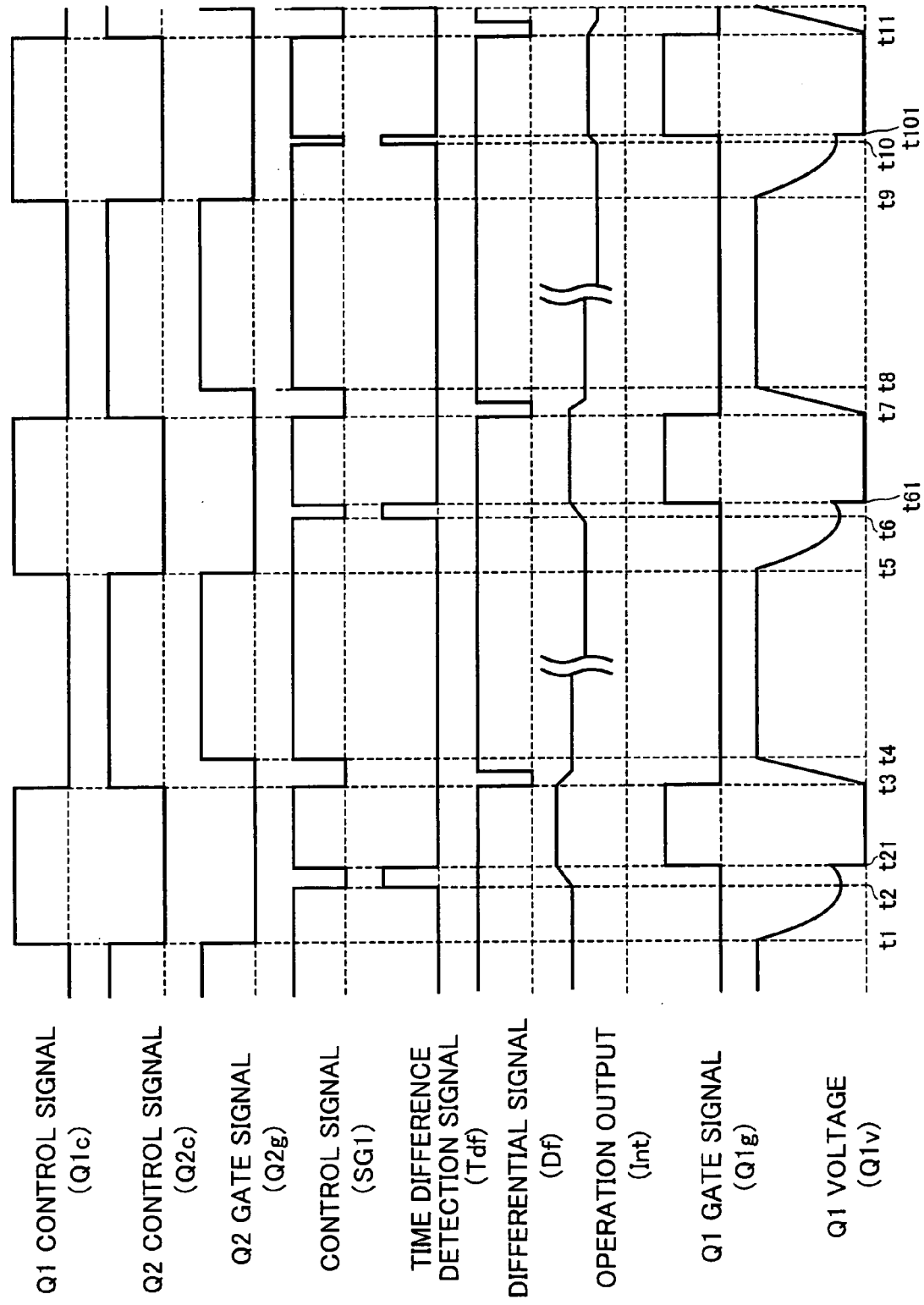
FIG. 10 is a timing chart showing operation of the DC converter of the second embodiment.

Operation of the DC converter according to the second embodiment with such a structure will be explained with reference to the timing chart of FIG. 10. In particular, operation of the pulse generation circuit 21 and operation circuit 22 will be explained.

Between time t1 and time t2, a voltage Q1v of the main switch Q1 decreases. In the time difference detection circuit 13a, a current is conducted through a route of D1, C1, P1, Vin, and GND to turn off a transistor Q3. As a result, a collector of the transistor Q3 changes to high level, and a control signal SG1 is supplied to a first input terminal of the NOR gate 132. Irrespective of a signal supplied to a second input terminal, the NOR gate 132 provides a time difference detection signal Tdf of low level from the output terminal thereof to the anode of the diode D5 of the operation circuit 22.

At time t2, the voltage Q1v reaches a minimum (bottom) value, and a current is conducted through a path including Vin, P1, C1, and Q3 to turn on the transistor Q3. Then, the collector of the transistor Q3 changes to low level, and the control signal SG1 is supplied to the first input terminal of the NOR gate 132. At this time, the second input terminal of the NOR gate 132 receives a Q2-control signal Q2c of low level, and therefore, the output terminal thereof provides a time detection signal Tdf of high level to the anode of the diode D5 of the operation circuit 22.

During a period between time t2 to time t21, the time difference detection signal Tdf of high level is supplied to the anode of the diode D5 of the operation circuit 22. This results in charging the capacitor C3 through the resistor R3, and a potential of the connection point between the resistor R3 and the capacitor C3 increases. The operation output Int from this connection point is supplied to the non-inversion terminal (+) of the error amplifier 141, and the error amplifier 141 provides an output voltage corresponding to the value of the operation output.

Namely, according to the value of the operation output Int from the operation circuit 22, the charging time of a capacitor C4 is shortened a delay time between a rise of a Q1-control signal Q1c and a rise of a Q1-gate signal Q1g. As explained above, due to the delay control of the actual rise timing (ON timing) of the Q1-gate signal Q1g, an interval between when the main switch Q1 reaches a minimum voltage and when the main switch Q1 turns on approaches a zero.

While the Q2-control signal Q2c is at high level (from time t3 to time t5), the NOR gate 132 controls the time difference detection circuit 13a to provide a time difference detection signal Tdf of low level. The pulse generation circuit 21 provides a differential signal Df of low level for a predetermined period after the Q2-control signal Q2c changes to high level. As a result, the capacitor C3 of the operation circuit 22 is discharged through the resistor R8 and diode D6, to decrease the potential of the connection point between the resistor R3 and the capacitor C3. Consequently, the capacitor C3 will easily be charged even if the pulse width of a time difference detection signal Tdf to be generated next is narrowed.

In this way, the DC converter according to the second embodiment provides the same effect as the DC converter according to the modification of the first embodiment. Even if a switching frequency is changed to improve efficiency under light load, the DC converter of the second embodiment can maintain a constant integration value of the time difference detection signal Tdf, to realize precision control.

Third Embodiment

Figure 11:
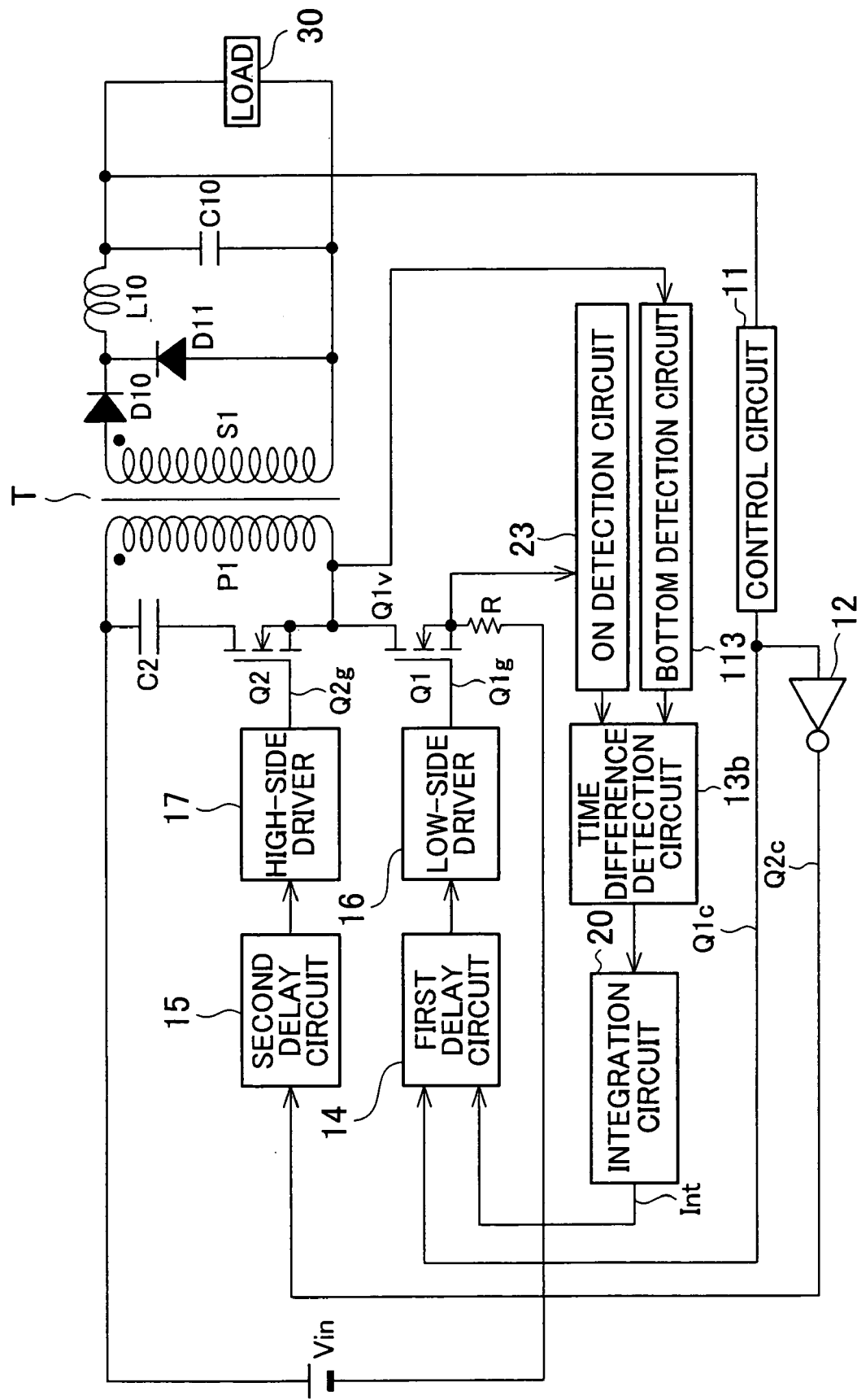
FIG. 11 is a circuit diagram showing a DC converter according to a third embodiment of the present invention.

FIG. 11 is a circuit diagram showing a DC converter according to the third embodiment. The DC converter of the third embodiment shown in FIG. 11 differs from the DC converter of the first embodiment shown in FIG. 3 in that it additionally has a bottom detection circuit 113, an ON detection circuit 23, and a resistor R so that a time difference detection circuit 13b. operates according to outputs of the bottom detection circuit 113 and ON detection circuit 23. In the following explanation, the same parts as those of FIG. 3 are represented with like reference marks to omit or simplify their explanations.

The bottom detection circuit 113 detects a minimum voltage (bottom voltage) of a main switch Q1 after a sub-switch Q2 turns off and provides a bottom detection signal Btm to the time difference detection circuit 13b. The resistor R is connected between a negative terminal of a DC power source Vin and a source of the main switch Q1.

The ON detection circuit 23 detects when the main switch Q1 turns on and the circuit provides an ON signal to the time difference detection circuit 13b. According to the bottom detection signal Btm from the bottom detection circuit 113 and the ON signal from the ON detection circuit 23, the time difference detection circuit 13b detects an interval between when the main switch Q1 reaches a minimum voltage (bottom voltage) after the sub-switch Q2 turns off and when the main switch Q1 turns on and provides a time difference detection signal Tdf to an integration circuit 20.

Figure 12:
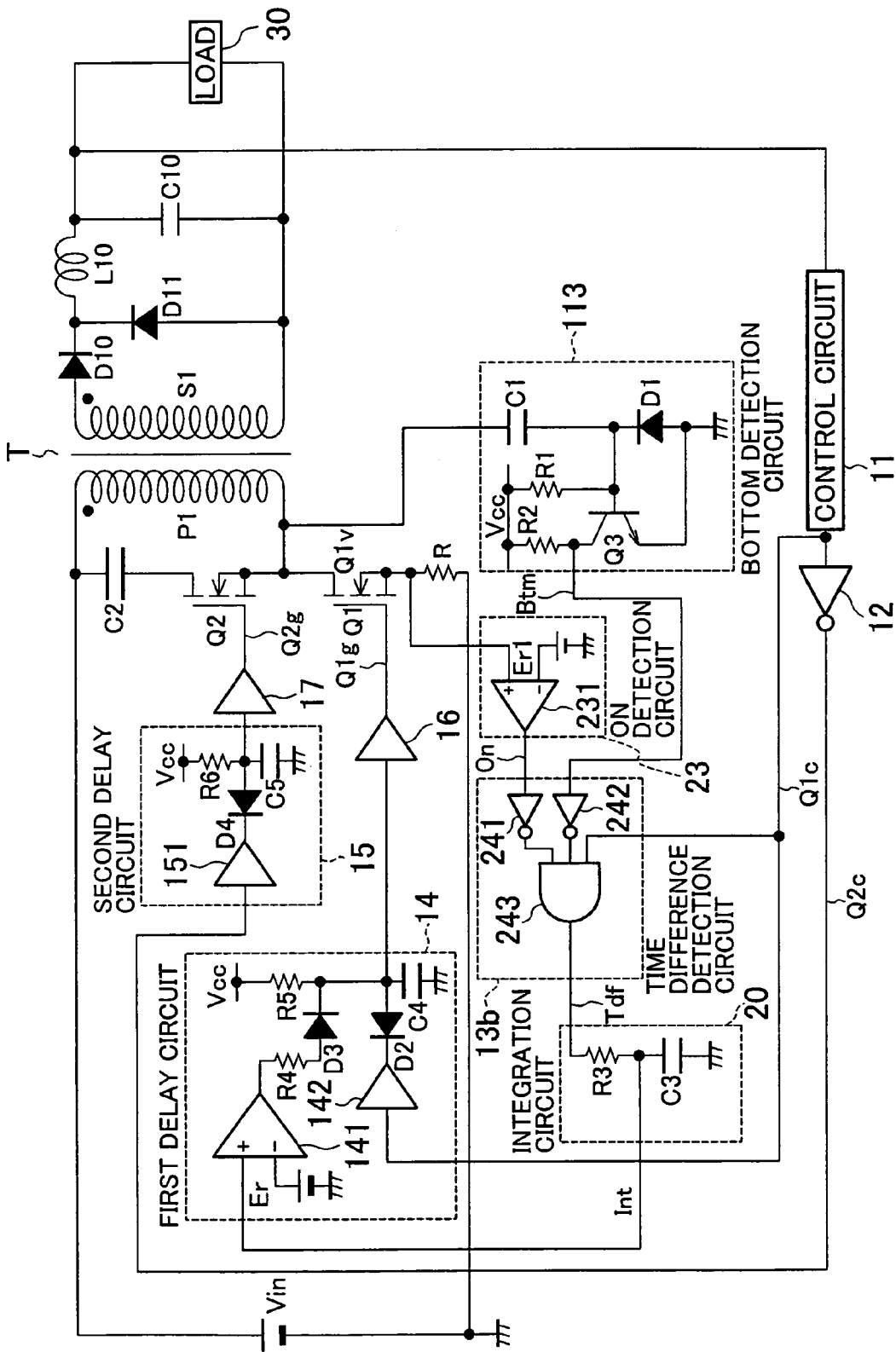
FIG. 12 is a circuit diagram showing the details of a time difference detection circuit, an integration circuit, a first delay circuit, and a second delay circuit in the DC converter of the third embodiment.

FIG. 12 is a circuit diagram showing the details of the DC converter of the third embodiment. In the bottom detection circuit 113 shown in FIG. 12, a base of a transistor Q3 is connected to a cathode of a diode D1, a first end of a resistor R1, and a first end of a capacitor C1. An emitter of the transistor Q3 is connected to an anode of the diode D1 and is grounded. A collector of the transistor Q3 is connected to a first end of a resistor R2. A second end of the resistor R1 and a second end of the resistor R2 are connected to a power source Vcc. A second end of the capacitor C1 is connected to a drain of the main switch Q1.

In the ON detection circuit 23, an inversion terminal—of an error amplifier 231 is connected to a reference power source Er1, and a non-inversion terminal (+) thereof is connected to a connection point between the source of the main switch Q1 and the resistor R. An output terminal of the error amplifier 231 is connected to the time difference detection circuit 13b.

In the time difference detection circuit 13b, an input terminal of an inverter 241 is connected to the output terminal of the error amplifier 231 of the ON detection circuit 23, to receive the ON signal. An output terminal of the inverter 241 is connected to an input terminal of an AND gate 243. An input terminal of an inverter 242 is connected to the collector of the transistor Q3 of the bottom detection circuit 113, to receive the bottom detection signal Btm. An output terminal of the inverter 242 is connected to an input terminal of the AND gate 243. The input terminals of the AND gate 243 receive an output from the inverter 241, an output from the inverter 242, and a Q1-control signal Q1c from a control circuit 11. The AND gate 243 provides a time difference detection signal Tdf to the integration circuit 20.

Figure 13:
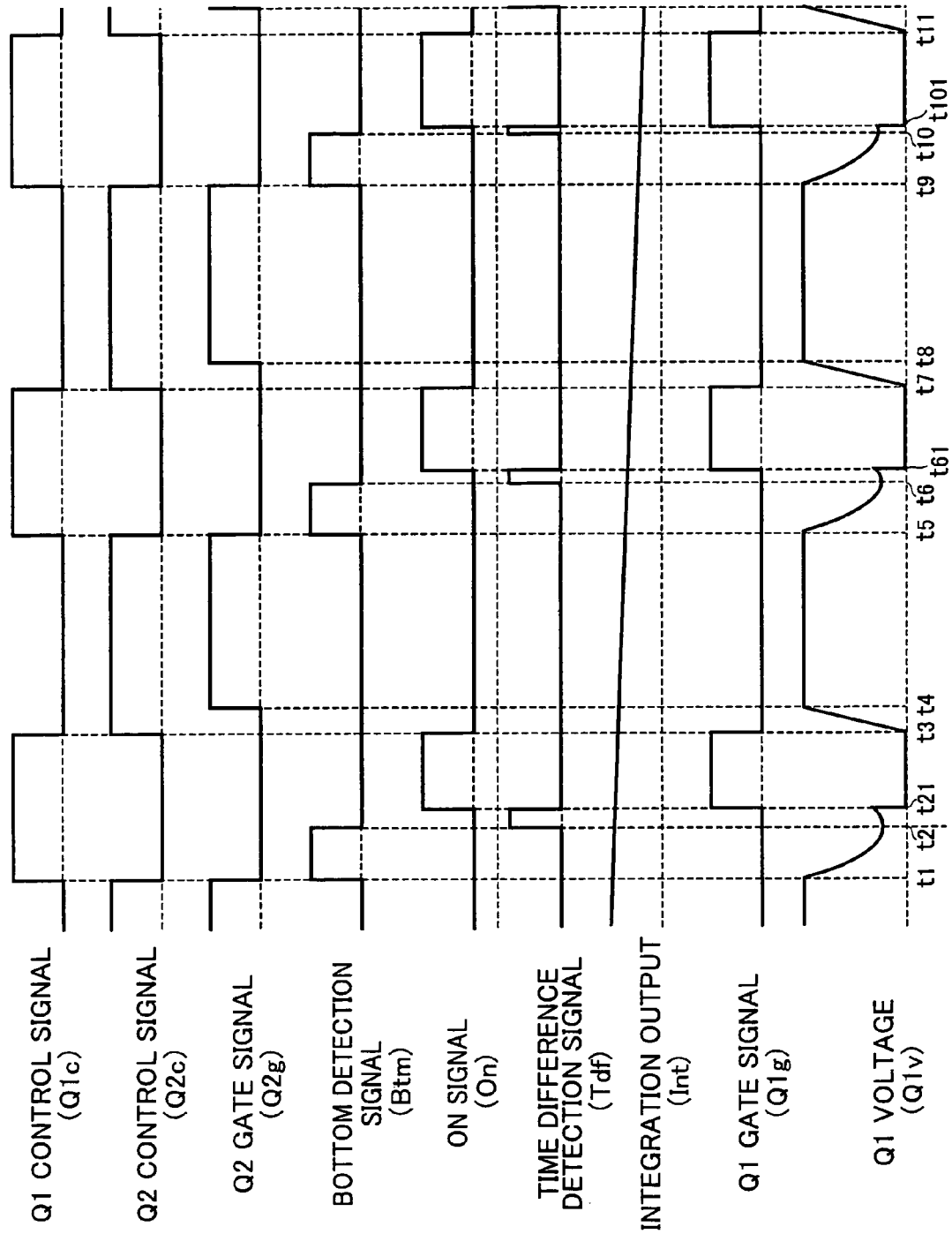
FIG. 13 is a timing chart showing operation of the DC converter of the third embodiment.

Operation of the DC converter according to the third embodiment with the above-mentioned structure will be explained with reference to the timing chart of FIG. 13. Operation of the bottom detection circuit 113, ON detection circuit 23, and time difference detection circuit will mainly be explained.

Between time t1 and time t2, a voltage Q1v of the main switch Q1 decreases, and in the bottom detection circuit 113, a current is conducted through a path including D1, C1, P1, Vin, and GND to turn off the transistor Q3. As a result, the collector of the transistor Q3 changes to high level to provide the bottom detection signal Btm to the input terminal of the inverter 242 of the time difference detection circuit 13b. Then, irrespective of signals received at the other input terminals, the AND gate 243 outputs a time difference detection signal Tdf of low level from the output terminal thereof to a first end of a resistor R3 of the integration circuit 20.

When the capacitor C1 finishes to discharge at time t2, a current from the resistor R1 becomes larger than a discharge current of the capacitor C1 so that a current is conducted through a path including Vcc, R1, and Q3 to turn on the transistor Q3. As a result, the bottom detection circuit 113 detects a minimum (bottom) value of the voltage Q1v. At this time, the collector of the transistor Q3 provides a bottom detection signal Btm of low level to the input terminal of the inverter 242 of the time difference detection circuit 13b. This signal is inverted by the inverter 242 and the inverted signal is supplied to the AND gate 243. At this time, the main switch Q1 is not ON, and therefore, the ON detection circuit 23 provides an ON signal of low level. The ON signal is supplied to the input terminal of the inverter 241 of the time difference detection circuit 13b and is inverted by the inverter 241, and the inverted signal is supplied to the AND gate 243. At time t2, the Q1-control signal Q1c is at high level, and therefore, the AND gate 243 provides a time difference detection signal Tdf of high level from the output terminal thereof to the first end of the resistor R3 of the integration circuit 20.

From time t2 to time t21, the time difference detection signal Tdf of high level is supplied to the first end of the resistor R3 of the integration circuit 20, and therefore, an integration output Int from a connection point between the resistor R3 and a capacitor C3 has a high voltage, which is supplied to a non-inversion terminal (+) of an error amplifier 141. The error amplifier 141 outputs a voltage corresponding to the value of the integration output.

As the value of the integration output Int from the integration circuit 20 increases, the charging time of a capacitor C4 shortens, to shorten a delay time between a rise of the Q1-control signal Q1c and a rise of a Q1-gate signal Q1g. As explained above, due to the delay control of the actual rise timing (ON timing) of the Q1-gate signal Q1g, an interval between when the main switch Q1 reaches a minimum voltage and when the main switch Q1 turns on approaches a zero.

At time t21, the main switch Q1 turns on and a current is conducted through the main switch Q1 to generate a voltage between the ends of the resistor R connected to the source of the main switch Q1. The generated voltage is supplied to the non-inversion terminal (+) of the error amplifier 231 of the ON detection circuit 23. Due to this, the ON signal from the error amplifier 231 changes to high level. The ON signal is supplied to the input terminal of the inverter 241 of the time difference detection circuit 13b and is inverted by the inverter 241, and the inverted signal is supplied to the AND gate 243. The time difference detection signal Tdf provided by the AND gate 243 changes to low level when the main switch Q1 turns on.

At time t3, the main switch Q1 turns off, and therefore, the voltage at the ends of the resistor R connected to the source of the main switch Q1 decreases. Then, the ON signal from the error amplifier 231 changes to low level. The ON signal is supplied to the input terminal of the inverter 241 of the time difference detection circuit 13b and is inverted by the inverter 241, and the inverted signal is supplied to the AND gate 243. From time t3 to time t5, however, a Q1-control signal Q1c of low level is supplied to the AND gate 243, and therefore, the time difference detection signal Tdf from the AND gate 243 maintains the low level.

In this way, the DC converter according to the third embodiment can provide the same effect as that of the DC converter of the first embodiment.

Fourth Embodiment

A DC converter according to the fourth embodiment will be explained. The DC converter of this embodiment is characterized by a sub-transformer that increases the inductance value of a reactor connected in series with a primary winding of a transformer and returns energy accumulated in the reactor during an ON period of a main switch Q1 to a secondary side of the transformer.

Figure 14:
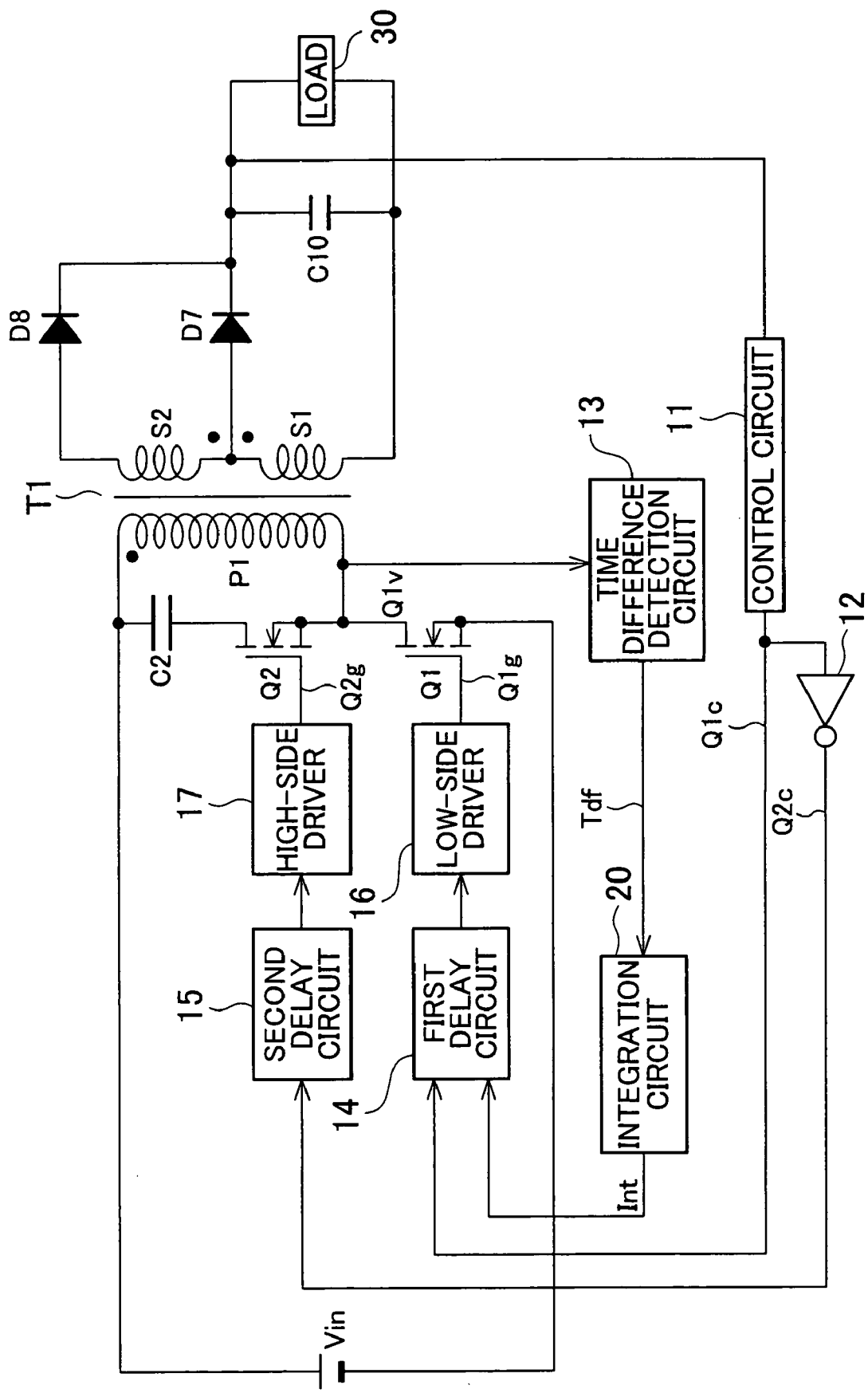
FIG. 14 is a circuit diagram showing a DC converter according to a fourth embodiment of the present invention.

FIG. 14 is a circuit diagram showing the DC converter according to the fourth embodiment. The DC converter according to the fourth embodiment shown in FIG. 14 differs from the DC converter of the first embodiment shown in FIG. 3 in a transformer T1 and peripheral circuits of the transformer T1. Accordingly, only these parts will be explained.

This embodiment connects the sub-transformer to the transformer T1. The transformer T1 includes a primary winding P1 (the number of windings of n1, also serving as a primary winding of the sub-transformer), a secondary winding S1 (the number of windings of n2), and a tertiary winding S2 (the number of windings of n3, corresponding to a secondary winding of the sub-transformer).

The secondary winding S1 and tertiary winding S2 of the transformer T1 form a series circuit whose ends are connected to a diode D8 and a capacitor C10 that form a series circuit. A connection point between the secondary winding S1 and the tertiary winding S2 and a connection point between the diode D8 and the capacitor C10 are connected to a diode D7. The primary winding P1 and secondary winding S1 are in phase, and the primary winding P1 and tertiary winding S2 are in opposite phases.

The secondary winding S1 and primary winding P1 of the transformer T1 are loosely coupled, and a leakage inductance between the primary winding P1 and the secondary winding S1 serves as a reactor (not shown) connected in series with the transformer T1. The tertiary winding S2 and primary winding P1 of the transformer T1 are closely coupled.

Operation of the DC converter according to this embodiment with the above-mentioned structure will be explained. Basic operation thereof is the same as that of the first embodiment. Operation of circuits on the secondary side of the transformer T1 will mainly be explained.

The main switch Q1 is turned on to pass a current through a path including Vin, P1, Q1, and Vin. At this time, a voltage is generated on the secondary winding S1 of the transformer T1 to pass a current through a path including S1, D7, C10, and S1. As a result, a current in the diode D7 linearly increases.

When the main switch Q1 is turned off, energy accumulated in the inductance of the transformer T1 returns to the secondary side through the transformer T1. On the secondary side, the tertiary winding S2 induces a voltage to pass a current through a path including S2, D8, C10, S1, and S2, thereby passing a current through the diode D8.

In this way, the value of the inductance connected in series with the primary winding P1 of the transformer T1 increases, and energy accumulated during an ON period of the main switch Q1 is returned to the secondary side through the transformer T1, to improve efficiency. The diodes D7 and D8 make a current on the secondary side to be conducted for continuation during an ON/OFF period of the main switch Q1. This reduces a ripple current of the capacitor C10.

Figure 15:
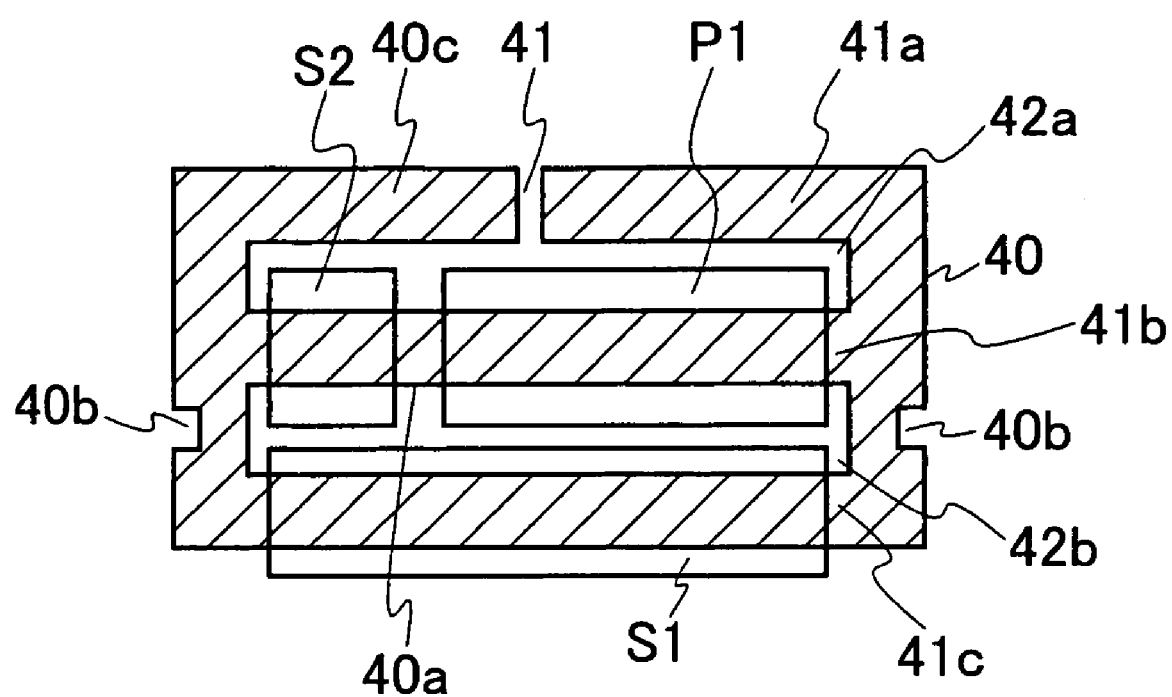
FIG. 15 is a schematic view showing a transformer in the DC converter of the fourth embodiment.

FIG. 15 shows an example of the transformer T1 coupled with the sub-transformer. The transformer of FIG. 15 has a core 40 having a rectangular external shape. The core 40 has long gaps 42a and 42b extended in a longitudinal direction of a magnetic path, to form magnetic paths 41a, 41b, and 41c. A core part 40a forming the magnetic path 41b has the primary winding P1 and tertiary winding S2 that are wound adjacent to each other. This arrangement forms a slight leakage inductance between the primary winding and the tertiary winding. The core 40 also includes a path core 40c and a gap 41, to form the magnetic path 41a. The secondary winding S1 is wound around a peripheral core. With the path core 40c, the primary winding P1 and secondary winding S1 are loosely coupled to form a large leakage inductance. This leakage inductance serves as a reactor (not shown).

Between the primary winding P1 and the secondary winding S1 on the peripheral core, two recesses 40b are formed. The recesses 40b partly narrow the cross-sectional area of the magnetic path of the peripheral core, to cause saturation only at the narrowed parts. This reduces a core loss.

In this way, this example designs the shape of the core and the windings of the transformer T so as to couple the transformer T1 and the sub-transformer on the single core 40, the sub-transformer returning energy of the reactor to a secondary side. In addition, this example employs the path core 40c to provide a large leakage inductance serving as a reactor coupled with the transformer. This arrangement can reduce the size and cost of the DC converter.

According to the first to fourth embodiments mentioned above, ends of the primary winding P1 of the transformer are connected to the series circuit consisting of the sub-switch Q2 and capacitor C2. This series circuit may be connected to, for example, each end of the main switch Q1.

According to the first to fourth embodiments, the series circuit consisting of the primary winding P1 of the transformer and the main switch Q1 is connected to the DC power source Vin. Instead, the series circuit may be connected to, for example, a voltage rectifying part that rectifies an AC voltage of an AC power source to provide a rectified voltage.

According to the first to fourth embodiments, the main switch Q1 has only a parasitic capacitor. Instead, the ends of the main switch Q1 may be connected to another capacitor.

Instead of the secondary-side circuit of the transformer of the DC converter according to the first to third embodiments, the secondary-side circuit of the transformer of the DC converter according to the fourth embodiment shown in FIG. 14 may be employed.

The delay control carried out on the first delay circuit 14 may be carried out on the second delay circuit 15.

EFFECT OF THE INVENTION

The present invention detects a time difference between when a main switch reaches a bottom voltage and when the main switch turns on, generates a finite pulse accordingly, and delays a control signal for the main switch in such a way as to eliminate the pulse. Accordingly, the present invention can realize stable operation against an error of a bottom detection circuit or disturbance of a detection point. The present invention eliminates the influence of a delay between bottom detection and activation of the main switch, thereby eliminating the need of turning on the main switch at high speed and minimizing switching noise.

INDUSTRIAL APPLICABILITY

The switching power source apparatuses according to the present invention are applicable to DC-DC converting type power source circuits and AC-DC converting type power source circuits.

The invention claimed is:

1. A DC converter that alternately turns on and off a main switch being connected in series with a primary winding of a transformer and a sub-switch being connected in series with a capacitance, the series circuit of the sub-switch and the capacitance being connected to each end of the primary winding of the transformer or to each end of the main switch, and the DC converter rectifies and smoothes a voltage of a secondary winding of the transformer with a rectifying/smoothing circuit, and provides a DC output, the DC converter comprising:
    a time difference detector to detect an interval between when the main switch reaches a minimum voltage after the sub-switch is turned off and when the main switch is turned on; and
    a delay controller to delay the ON timing of the main switch according to an output from the time difference detector so that the main switch is turned on at around the minimum voltage.

2. A DC converter that alternately turns on and off a main switch being connected in series with a primary winding of a transformer and a sub-switch being connected in series with a capacitance, the series circuit of a capacitance and the sub-switch being connected to each end of the primary winding of the transformer or to each end of the main switch, and the DC converter rectifies and smoothes a voltage of a secondary winding of the transformer with a rectifying/smoothing circuit, and provides a DC output, the DC converter comprising:
    a bottom detector to detect a minimum voltage of the main switch when the main switch decreases voltage after the sub-switch is turned off;
    an ON detector to detect an instance when the main switch is turned on;
    a time difference detector to detect an interval between when the bottom detector detects the minimum voltage and when the ON detector detects an ON state of the main switch; and
    a delay controller to delay the ON timing of the main switch according to an output from the time difference detector so that the main switch is turned on at around the minimum voltage.

3. The DC converter of claim 1, further comprising:
    an integrator to integrate the output from the time difference detector,
    the delay controller delaying the ON timing of the main switch according to an integrated output from the integrator so that the main switch is turned on at around the minimum voltage.

4. The DC converter of claim 2, further comprising:
    an integrator to integrate the output from the time difference detector,
    the delay controller delaying the ON timing of the main switch according to an integrated output from the integrator so that the main switch is turned on at around the minimum voltage.

5. The DC converter of claims 1, further comprising:
    an adder to add up the output from the time difference detector; and
    a subtracter to subtract a predetermined value from a sum from the adder at every ON/OFF period of the main switch,
    the delay controller delaying the ON timing of the main switch according to an output from the adder so that the main switch is turned on at around the minimum voltage.

6. The DC converter of claim 2, further comprising:
    an adder to add up the output from the time difference detector; and
    a subtracter to subtract a predetermined value from a sum from the adder at every ON/OFF period of the main switch,
    the delay controller delaying the ON timing of the main switch according to an output from the adder so that the main switch is turned on at around the minimum voltage.

7. The DC converter of claim 3, wherein the delay controller has:
    a delay part to delay a signal to turn on the main switch by a predetermined delay time according to a charging time of a delay capacitor connected in series with a resistor; and
    a variable delay part to provide the delay capacitor with a voltage difference between the integrated output from the integrator and a reference voltage, thereby shortening the predetermined delay time according to the voltage difference,
    a control signal generated according to a voltage of the delay capacitor being applied to a control terminal of the main switch.

8. The DC converter of claim 4, wherein the delay controller has:
a delay part to delay a signal to turn on the main switch by a predetermined delay time according to a charging time of a delay capacitor connected in series with a resistor; and
a variable delay part to provide the delay capacitor with a voltage difference between the integrated output from the integrator and a reference voltage, thereby shortening the predetermined delay time according to the voltage difference,
a control signal generated according to a voltage of the delay capacitor being applied to a control terminal of the main switch.

9. The DC converter of claim 5, wherein the delay controller has:
a delay part to delay a signal to turn on the main switch by a predetermined delay time according to a charging time of a delay capacitor connected in series with a resistor; and
a variable delay part to provide the delay capacitor with a voltage difference between the output from the adder and a reference voltage, thereby shortening the predetermined delay time according to the voltage difference,
a control signal generated according to a voltage of the delay capacitor being applied to a control terminal of the main switch.

10. The DC converter of claim 6, wherein the delay controller has:
a delay part to delay a signal to turn on the main switch by a predetermined delay time according to a charging time of a delay capacitor connected in series with a resistor; and
a variable delay part to provide the delay capacitor with a voltage difference between the output from the adder and a reference voltage, thereby shortening the predetermined delay time according to the voltage difference,
a control signal generated according to a voltage of the delay capacitor being applied to a control terminal of the main switch.

11. The DC converter of claim 1, further comprising:
a voltage rectifying part to rectify a DC power source or an AC voltage of an AC power source and provide a rectified voltage, the voltage rectifying part being connected to each end of a series circuit including the primary winding of the transformer and the main switch.

12. The DC converter of claim 2, further comprising:
a voltage rectifying part to rectify a DC power source or an AC voltage of an AC power source and provide a rectified voltage, the voltage rectifying part being connected to each end of a series circuit including the primary winding of the transformer and the main switch.

13. The DC converter of claim 1, further comprising:
a reactor connected between the primary winding of the transformer and the main switch; and
a sub-transformer being connected in series with the transformer, to reflux energy accumulated when the main switch is ON in the reactor to a secondary side when the main switch is turned off.

14. The DC converter of claim 2, further comprising:
a reactor connected between the primary winding of the transformer and the main switch; and
a sub-transformer being connected in series with the transformer, to reflux energy accumulated when the main switch is ON in the reactor to a secondary side when the main switch is turned off.

15. The DC converter of claim 13, wherein:
the reactor is a leakage inductance between the primary and secondary windings of the transformer that are loosely coupled around a core of the transformer; and
the primary winding of the transformer and a secondary winding of the sub-transformer are closely coupled around the core of the transformer.

16. The DC converter of claim 14, wherein:
the reactor is a leakage inductance between the primary and secondary windings of the transformer that are loosely coupled around a core of the transformer; and
the primary winding of the transformer and a secondary winding of the sub-transformer are closely coupled around the core of the transformer.

* * * * *